US008751155B2

(12) United States Patent
Lee (10) Patent No.: US 8,751,155 B2
(45) Date of Patent: Jun. 10, 2014

(54) MOBILE VEHICLE NAVIGATION METHOD AND APPARATUS THEREOF

(75) Inventor: Jin-Sang Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 12/434,172

(22) Filed: May 1, 2009

(65) Prior Publication Data

US 2010/0082232 A1     Apr. 1, 2010

(30) Foreign Application Priority Data

Oct. 1, 2008    (KR) .......................... 10-2008-0096830

(51) Int. Cl.
    *G01C 21/00*      (2006.01)
(52) U.S. Cl.
    USPC ........... 701/425; 701/411; 701/412; 701/410; 340/995.23
(58) Field of Classification Search
    USPC ......... 701/207, 208, 209, 210, 211, 212, 410, 701/411, 412, 425, 428, 429; 340/995.1, 340/995.14, 995.15, 995.16, 995.22, 995.23
    See application file for complete search history.

(56) References Cited

U.S. PATENT DOCUMENTS

| 6,411,867 | B1 * | 6/2002 | Sakiyama et al. | ................ | 701/1 |
|---|---|---|---|---|---|
| 7,788,028 | B2 * | 8/2010 | Matsuoka et al. | ............ | 701/425 |
| 7,840,347 | B2 * | 11/2010 | Noguchi | ....................... | 701/209 |
| 8,200,429 | B2 * | 6/2012 | Sasano | ......................... | 701/467 |
| 8,234,059 | B2 * | 7/2012 | Sugiyama et al. | ............ | 701/418 |
| 2008/0243373 | A1 * | 10/2008 | Cat et al. | ....................... | 701/207 |
| 2009/0228207 | A1 * | 9/2009 | Sasano | ......................... | 701/210 |
| 2010/0070161 | A1 * | 3/2010 | Harris | ........................... | 701/201 |
| 2011/0022308 | A1 * | 1/2011 | Britton | ......................... | 701/202 |

FOREIGN PATENT DOCUMENTS

| JP | 08247776 | A | * | 9/1996 |
|---|---|---|---|---|
| JP | 2000111354 | A | * | 4/2000 |
| JP | 2001091283 | A | * | 4/2001 |
| JP | 2006322781 | A | * | 11/2006 |

\* cited by examiner

*Primary Examiner* — Ernesto Suarez
(74) *Attorney, Agent, or Firm* — Birch, Stewart, Kolasch & Birch, LLP (57) ABSTRACT

A method of controlling a vehicle navigation apparatus included in a vehicle, and which includes displaying road guidance information on a touch screen display of the vehicle navigation apparatus and including a set travel route from a current position of a vehicle to a destination, determining, via a controller, whether a particular road displayed on the road guidance information has been drawn on, said particular road corresponding to a road that is different than a road included in the set travel route from the current position of the vehicle to the destination, and setting, via the controller, a road matched to the particular road that has been drawn on as a detour.

14 Claims, 11 Drawing Sheets

MOBILE VEHICLE NAVIGATION METHOD AND APPARATUS THEREOF

CROSS-REFERENCE TO A RELATED APPLICATION

The present invention claims priority to Korean Application No. 10-2008-0096830, filed in Korea on Oct. 1, 2008, which is herein expressly incorporated by reference in its entirety.

BACKGROUND OF THE INVENTION

1. Field of the Invention

The present invention relates to a mobile vehicle navigation apparatus and corresponding vehicle navigation method.

2. Description of the Related Art

Figure 1:
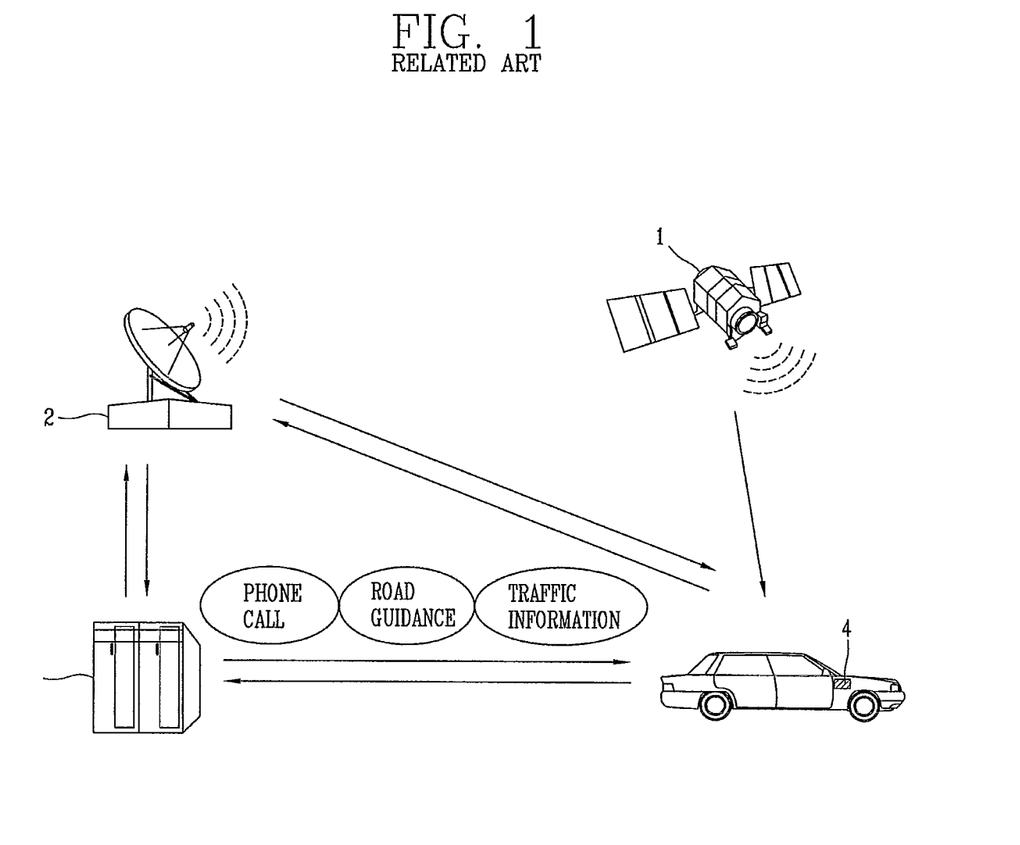
FIG. 1 is a block diagram illustrating a related art vehicle navigation system.

A vehicle navigation device provides a user with road guidance information based on a GPS (Global Positioning System) signal and map information. For example, FIG. 1 is a block diagram of a related art vehicle navigation system. As shown in FIG. 1, the related art vehicle navigation system includes at least one satellite 1, an antenna station 2, an information providing center 3 providing traffic information, and a vehicle navigation device 4 mounted in a vehicle. Thus, the vehicle including the navigation device 4 can receive traffic information and road guidance information provided by the vehicle navigation system.

However, the traffic and road guidance information provided by the navigation system is limited in nature, and the user is not able to sufficiently interact with the information provided by the system. Thus, the user must rely solely on the information provided by the navigation system.

SUMMARY OF THE INVENTION

Accordingly, one object to the present invention is to address the above-noted and other problems with the related art.

Another object of the present invention is to allow the user to select a detour route he or she may want to travel on.

Still another object of the present invention is to allow the user to draw a line on a screen of a navigation apparatus to designate a possible detour route he or she may want to travel on.

To achieve these and other advantages and in accordance with the purpose of the present invention, as embodied and broadly described herein, the present invention provides in one aspect a method of controlling a vehicle navigation apparatus included in a vehicle, and which includes displaying road guidance information on a touch screen display of the vehicle navigation apparatus and including a set travel route from a current position of a vehicle to a destination, determining, via a controller, whether a particular road displayed on the road guidance information has been drawn on, said particular road corresponding to a road that is different than a road included in the set travel route from the current position of the vehicle to the destination, and setting, via the controller, a road matched to the particular road that has been drawn on as a detour.

In another aspect, the present invention provides a vehicle navigation apparatus including a touch screen display unit configured to display road guidance information including a set travel route from a current position of a vehicle to a destination, and a controller configured to determine whether a particular road displayed on the road guidance information has been drawn on, said particular road corresponding to a road that is different than a road included in the set travel route from the current position of the vehicle to the destination, and to set a road matched to the particular road that has been drawn on as a detour.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 2:
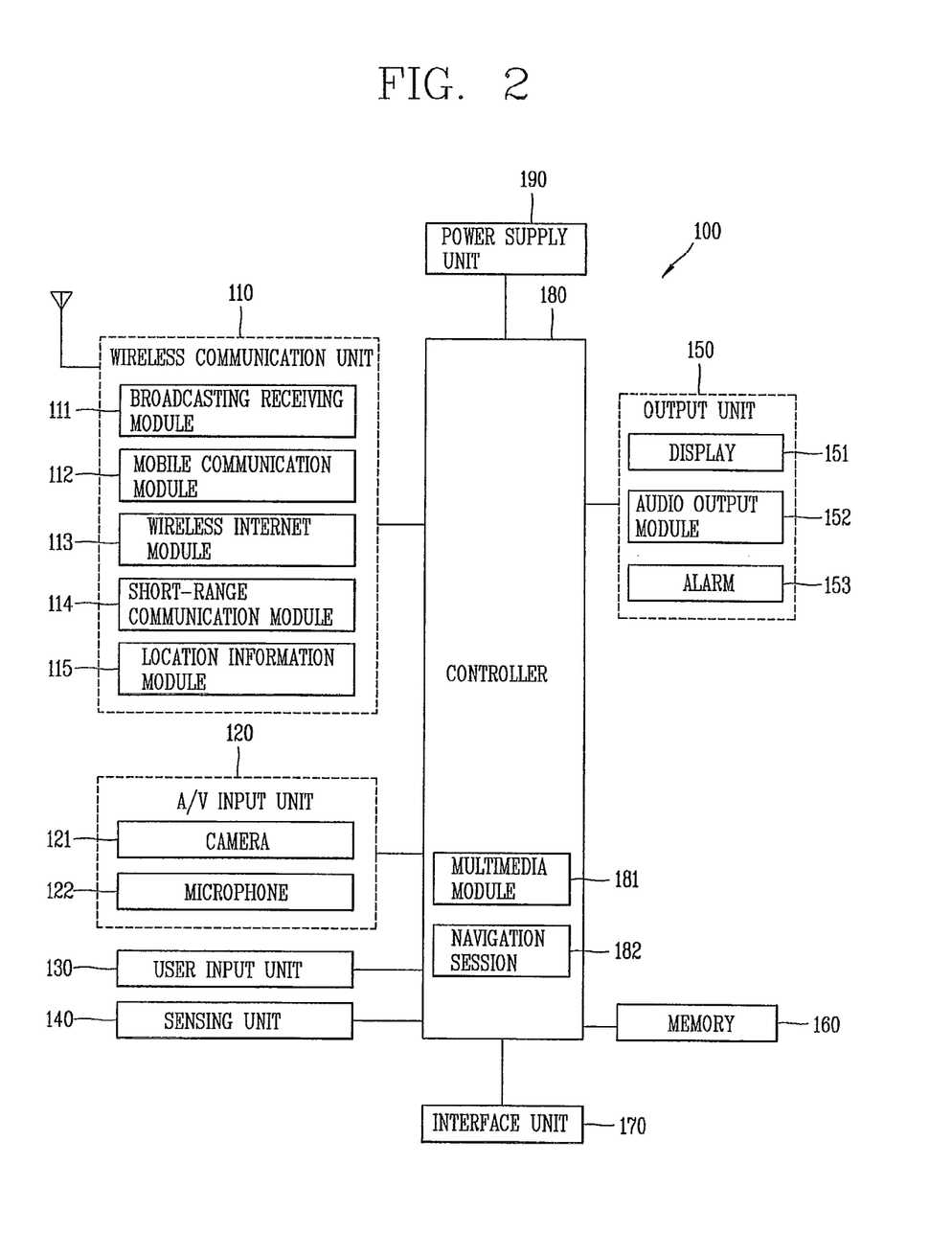
FIG. 2 is a block diagram illustrating a mobile terminal including a navigation function according to an embodiment of the present invention.

FIG. 2 is a block diagram of a mobile terminal 100 including a navigation function according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, FIG. 2 illustrates the wireless communication unit 110 including a broadcast receiving module 111 that receives a broadcast signal and/or broadcast associated information from an external broadcast managing entity via a broadcast channel. The broadcast channel may include a satellite channel and a terrestrial channel. In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) broadcasting (DMB) system and an electronic service guide (ESG) of the digital video broadcast-handheld (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal. The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others. Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. In addition, as shown in FIG. 2, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc. The sensing unit can also include a proximity sensor located in an internal region of the mobile terminal 100, surrounded by the touch screen, or near the touch screen. The proximity sensor senses an object approaching a predetermined sensing face or an object located near the proximity sensor using an electromagnetic force or infrared rays without having mechanical contact.

Further, the proximity sensor has a lifetime longer than that of a contact sensor and has wide application. The proximity sensor also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer it not in contact with the touch screen such that the location of the pointer on the touch screen is recognized is referred to as "proximity touch" and an action of bringing the pointer into contact with the touch screen is referred to as "contact touch" in the following description.

Also, a proximity touch point of the pointer on the touch screen means a point of the touch screen to which the pointer corresponds perpendicularly to the touch screen when the pointer proximity-touches the touch screen. Further, the proximity sensor senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display module 151 (hereinafter referred to as the display 151) that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display, a three-dimensional display, and a transparent OLED (TOLED).

The mobile terminal 100 may also include one or more of such displays. An example of a two-display embodiment is one in which one display is configured as an internal display (viewable when the terminal is in an opened position) and a second display configured as an external display (viewable in both the open and closed positions). FIG. 2 further shows the output unit 150 having an audio output module 152, which supports the audio output requirements of the mobile terminal 100. The audio output module 152 can be implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message. As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc. Further, the memory 160 shown in FIG. 2 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 2, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Further, a navigation session 182 is also included within the controller 180 of the mobile terminal 100 according to an embodiment of the present invention. The navigation session 182 displays road guidance information, determines whether or not a line has been drawn along a particular road on the road guidance information, and sets a road matched to the drawn line as a detour.

Figure 3:
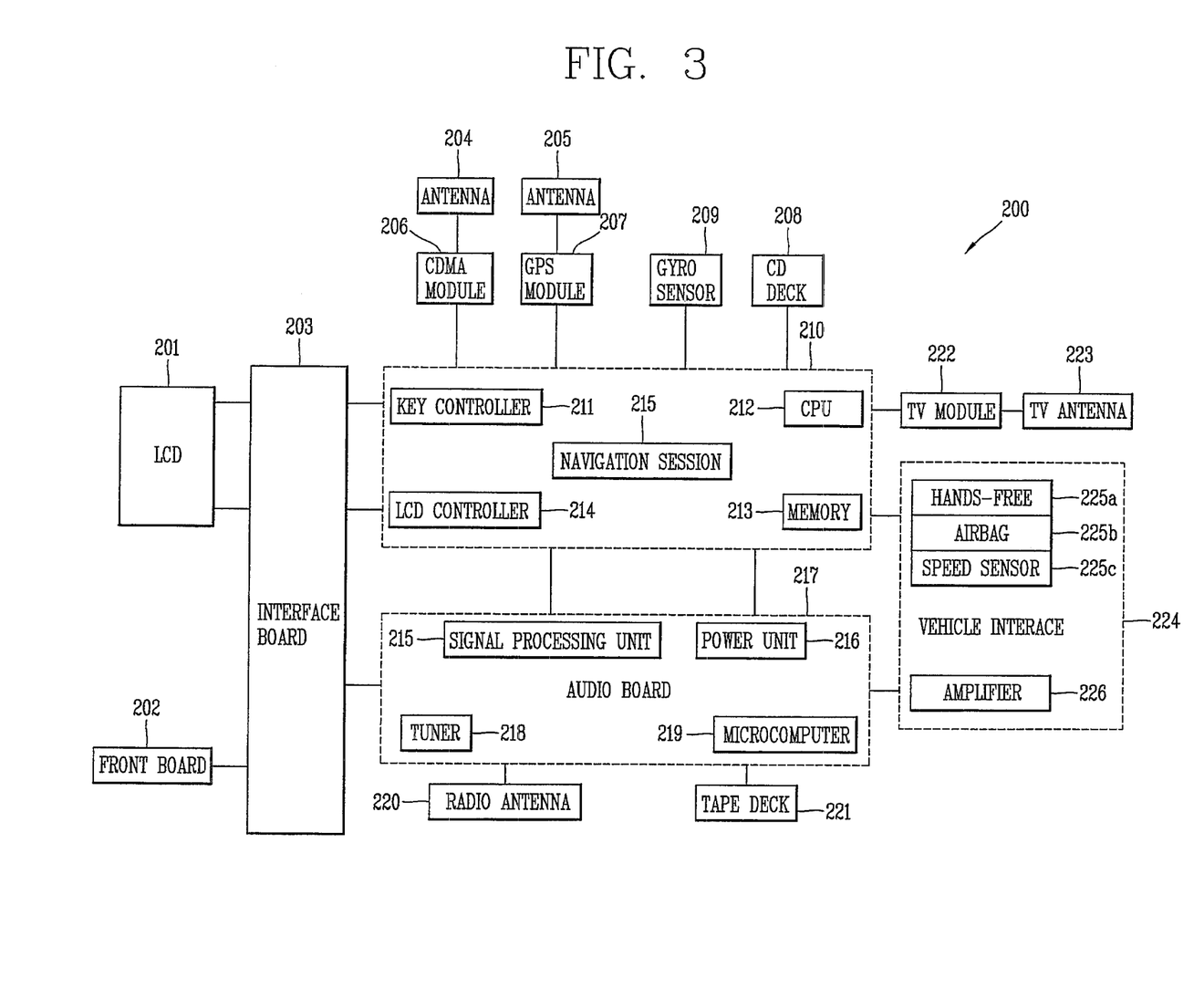
FIG. 3 is a block diagram illustrating a telematics terminal including a vehicle navigation function according to an embodiment of the present invention.

Next, FIG. 3 is a block diagram of a telematics system 200 including a vehicle navigation apparatus according to an embodiment of the present invention. In this example, the system 200 is installed in a vehicle driven by a user. As shown in FIG. 3, the telematics system 200 includes a vehicle navigation session 215 included in a main board 210. The main board 210 also includes a key controller 211, a CPU (Central Processing Unit) 212 for controlling overall operations in the telematics system 200, a memory 213 for storing various information, a key controller 211 for controlling various key signals, and an LCD controller 214 for controlling an LCD.

Further, the memory 213 stores map information (e.g., map data) for displaying road guidance information on a digital map. Also, the memory 213 stores a traffic information collecting control algorithm for inputting traffic information according to the situation of a road along which the vehicle currently travels and information for controlling the algorithm. Also included is a CDMA module 206 associated with an antenna 204, and a GPS module 207 associated an antenna 205. The GPS module 207 also operates to receive a GPS signal for tracking a travel route from a start point to a destination, transmitting traffic information collected by the user as a GPS signal, and provides information about the current position of the vehicle. The system 200 also includes a CD deck 208 for reproducing data recorded in a CD (Compact Disk), and a gyro sensor 209. In addition, the CDMA module 206 and the GPS module 207 receive signals via the antennas 204 and 205.

The system 200 also includes a TV module 222 connected with the main board 210 and receiving a TV signal via a TV antenna 223. The main board 210 is also connected with an LCD 201 via an interface board 203 and is controlled by the LCD controller 214. A front board 202 is also connected to the main board 210 via the interface board 203 and is controlled by the key controller 211. Further, the LCD 201 displays various video signals and character signals, and the front board 202 includes buttons for various key signal inputs and provides a key signal corresponding to a button selected by the user to the main board 210. The front board 202 also includes a menu key for directly inputting traffic information. The menu key may be configured to be controlled by the key controller 211.

The system 200 also includes an audio board 217 connected with the main board 210 and that processes various audio signals. As shown in FIG. 3, the audio board 217 includes a microcomputer 219 for controlling the audio board 217, a tuner 218 for receiving a radio signal, a power source unit 216 for supplying power to the microcomputer 219 and a signal processing unit 215 for processing various voice signals. The audio board 217 can also be associated with a radio antenna 220 for receiving a radio signal and a tape deck 221 for reproduce an audio tape.

The audio board 217 and the main board 210 also may interface with a vehicle interface 224. Namely, the audio board 217 and the main board 210 are connected to the vehicle interface 224. As shown, the vehicle interface 224 includes an amplifier 226 for outputting a voice signal processed by the audio board 217, a hands-free unit 225a for inputting a voice signal, an airbag 225b configured for the security of a passenger, a speed sensor 225c for detecting the speed of the vehicle, or the like. The speed sensor 225c calculates a vehicle speed and provides the calculated vehicle speed information to the CPU 212.

In addition, the navigation session 215 applied to the telematics system 200 according to embodiments of the present invention displays road guidance information, determines whether a line has been drawn along a particular road on the road guidance information when displaying the road guidance information, and sets a road matched to the drawn line as a detour. Further, the functions of the navigation session 215 according to the embodiments of the present invention may be performed by the CPU (controller) 212 of the telematics terminal 200. As discussed above, FIG. 3 illustrates the navigation session 215 being included in a vehicle. However, the navigation session 215 according to embodiments of the present invention can also be included in a mobile terminal that is carried by a user, such as a cell phone.

Figure 4:
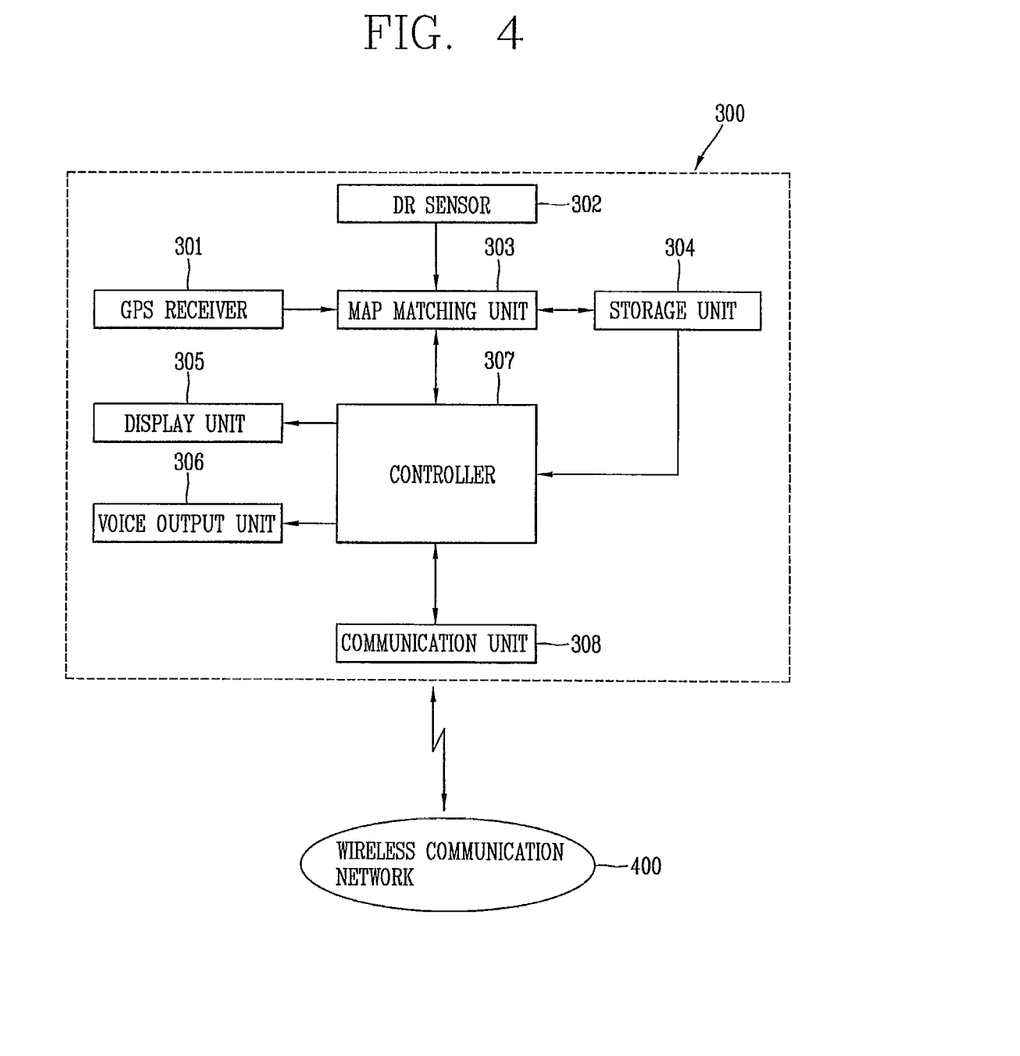
FIG. 4 is a block diagram illustrating a vehicle navigation apparatus according to a first embodiment of the present invention.

Next, FIG. 4 is a block diagram illustrating a vehicle navigation apparatus 300 according to a first embodiment of the present invention. As shown in FIG. 4, the navigation apparatus 300 includes a GPS receiver 301 for receiving a GPS signal from a satellite and generating first vehicle location data of the navigation apparatus based on the received GPS signal, a DR (Dead-Reckoning) sensor 302 for generating second vehicle location data based on a travel direction and the speed of a vehicle, and a storage unit 304 for storing map data. The apparatus 300 also includes a map matching unit 303 for generating a vehicle estimated location based on the first and second vehicle location data, matching the generated vehicle estimated location and a line (map matching link or a map matching road) in map data stored in the storage unit 304, and outputting the matched map information (map matching results).

Further, the apparatus 300 includes a communication unit 308 for receiving real time traffic information from an information providing center via a wireless communication network 400, and a controller 307 for receiving the real time traffic information, generating road guidance information based on the matched map information, determining whether or not a line has been drawn along a particular road on the road guidance information, and setting a road matched to the drawn line as a detour. In addition, the apparatus 300 includes a display unit 305 for displaying a road guidance map included in the road guidance information, and a voice output unit 306 for outputting road guidance voice information (e.g., road guidance voice message) included in the road guidance information.

The navigation apparatus 300 also corresponds to features included in the system 200 or the mobile terminal 100 shown in FIGS. 2 and 3. For example, the GPS receiver 301 may be the GPS module 207 of the telematics system 200, the storage unit 304 may be the memory 213 of the telematics system 200, the display unit 305 may be the LCD 201 of the telematics system 200, and the voice output unit 306 may be the amplifier 226 of the telematics system 200. In addition, the functions of the map matching unit 303 and the controller 307 may be performed by the CPU 212 of the telematics system 200.

Further, the controller 307 in FIG. 4 generally controls the overall operations of the navigation apparatus 300 and displays the road guidance information, determines whether a line has been drawn along a particular road on the road guidance information, determines whether there is a road matched to the drawn line in the map data, sets a road matched to the drawn line as a detour when there is a road matched to the drawn line, and outputs road guidance information by way of the set detour. Thus, the user can draw a line on the displayed road guidance information to select a desired detour. In addition, the technique of generating the vehicle estimated location based on the first vehicle location data generated by the GPS receiver 301 and the second vehicle location data generated by the DR sensor 302 is a known art, so its detailed description will be omitted.

One configuration of the vehicle navigation apparatus according to the embodiments of the present invention will now be described in more detail with reference to FIG. 4. When a road guidance mode is selected, the GPS receiver 301 receives a GPS signal from a satellite, generates first vehicle location data in real time based on the longitude and latitude coordinates included in the received GPS signal, and outputs the first vehicle location data to the map matching unit 303. The vehicle location information can be also received through Wi-Fi or WiBro communication.

In addition, the DR sensor 302 generates the second vehicle location data based on the travel direction and the speed of the vehicle, and outputs the second vehicle location data to the map matching unit 303. The map matching unit 303 generates a vehicle estimated location based on the first and second vehicle location data, and reads map data corresponding to a travel route from the storage unit 304. The map matching unit 303 also matches the vehicle estimated location and a link (road) included in the map data, and outputs the matched map information (map matching results) to the controller 307. For example, the map matching unit 303 generates the vehicle estimated location based on the first and second location data, matches the generated vehicle estimated location and links in the map data stored in the storage unit 304 according to the link order, and outputs the matched map information (map matching results) to the controller 307.

Further, the controller 307 generates road guidance information based on the matched map information, and outputs the generated road guidance information to the display unit 305 and the voice output unit 306. The display unit 305 then displays the road guidance information. Also, the controller 307 determines whether a line has been drawn on the touch screen of the display unit 305 along a particular road on the road guidance information. That is, the user may draw a line on the touch screen along the particular rod displayed on the road guidance information with a stylus or his or her finger. In addition, the particular road is not a road corresponding to the travel route from a current location of the vehicle to a destination, but is a neighbor road or an adjacent road of the road the vehicle is currently driven on. That is, the particular road refers to another road besides the road being displayed corresponding to the travel route from the current location of the vehicle to the destination.

Further, when a line has been drawn along the particular road on the road guidance information through the touch screen, the controller 307 determines whether a road matched to the drawn line exists in the map data stored in the storage unit 304. For example, the controller 307 compares the line drawn along the particular road with the stored map data and searches the map data for a road matched to the line drawn along the particular road. The controller 307 then automatically sets the road matched to the drawn line as a detour, and reflects the set detour on the road guidance information.

That is, the controller 307 sets the road corresponding to a route between a start point and an end point of the drawn line as the detour, and provides the road guidance information by way of the set detour to the driver. For example, when a traffic jam occurs or a road is under construction while the driver is driving his her vehicle along the predetermined travel route from the current location of the vehicle to the destination, the driver can draw a line with his or her finger along a detour particular road displayed on the road guidance information to avoid such situation. Then, the controller 307 automatically sets the road corresponding to the drawn line as a detour. Accordingly, the driver can quickly and accurately set the desired detour while being provided with the road guidance information. The controller 307 may also display the line with a predetermined color (e.g., red) or with a predetermined solid line or dotted line, or make the line blink to identify the particular road as the detour.

Figure 5:
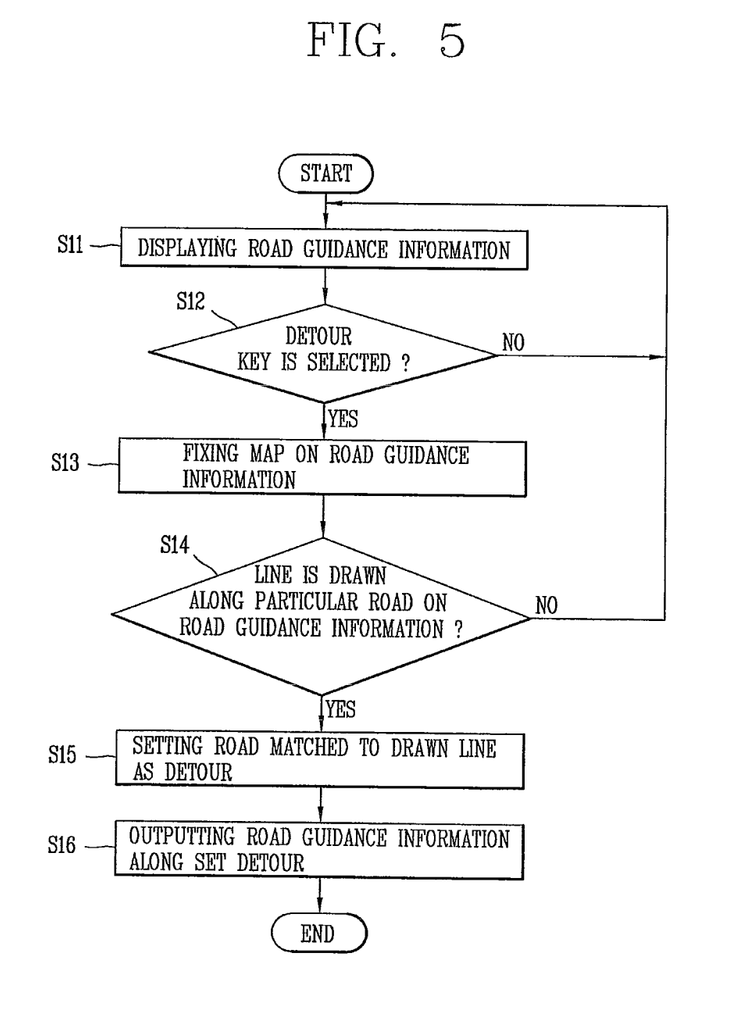
FIG. 5 is a flow chart illustrating a vehicle navigation method according to the first embodiment of the present invention.
Figure 6:
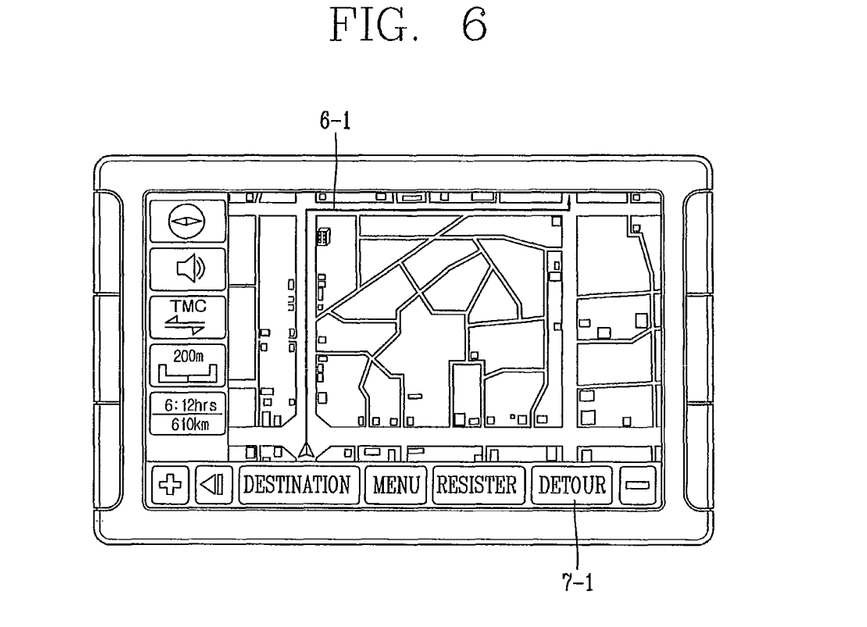
FIG. 6 is an overview of a display screen illustrating road guidance information displayed on the vehicle navigation apparatus according to the first embodiment of the present invention.

Next, FIG. 5 is a flow chart illustrating a vehicle navigation method according to a first embodiment of the present invention. FIG. 4 will also be referred to throughout the description of the embodiments of the present invention. As shown in FIG. 5, the controller 307 generates road guidance information based on the matched map information, and outputs the generated road guidance information to the display unit 305 and the voice output unit 306. The display unit 305 then displays the road guidance information and the voice output unit 306 outputs voice information included in the road guidance information (S11). For example, FIG. 6 is an overview of a display screen illustrating road guidance information displayed on the vehicle navigation apparatus according to the first embodiment of the present invention. As shown, the display unit 305 displays the road guidance information corresponding to a travel route 6-1 from the current location of the vehicle to the destination.

The controller 307 then determines whether or not a detour setting key (button) displayed together with the road guidance information is selected by the user while the road guidance information is being displayed (S12). FIG. 6 illustrates an example of a detour button 7-1 the user can select by touching. The detour button is particular advantageous, because generally if the user drags a particular point in the map on the road guidance information, rather than selecting the detour setting key, the display unit 305 would move the map according to the drag operation being performed by the user. Thus, in one embodiment, the displayed map is fixed via the selection of a detour button such that the user can draw a line along a particular detour road (S13). The detour button can be the soft-key detour button 7-1 in FIG. 6, a particular touch input manner (e.g., a double touch operation), a separate mechanical, physical or hard key, etc. The user can also input a voice instruction to the navigation apparatus or use a proximity touch to place the apparatus into the detour mode.

Figure 7:
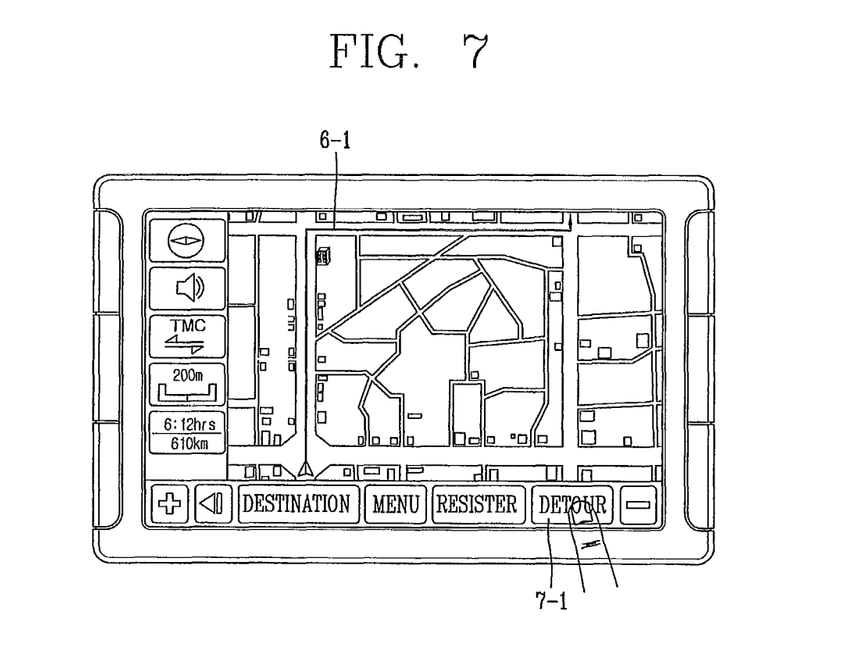
FIG. 7 is an overview of a display screen illustrating road guidance information and a detour setting key displayed on the vehicle navigation apparatus according to the first embodiment of the present invention.

In more detail, FIG. 7 is an overview of a display screen illustrating road guidance information 6-1 and the detour setting key 7-1 displayed on the vehicle navigation apparatus according to the first embodiment of the present invention. As shown in FIG. 7, while the road guidance information is displayed along the travel route 6-1, the user selects or touches the detour setting key 7-1. The controller 307 then fixes the map road guidance information. In addition, in one example, the controller 307 can fix the map on the road guidance information for a pre-set time (e.g., five to ten seconds), and when the pre-set time lapses, the controller 307 can release the fixed map.

Figure 8:
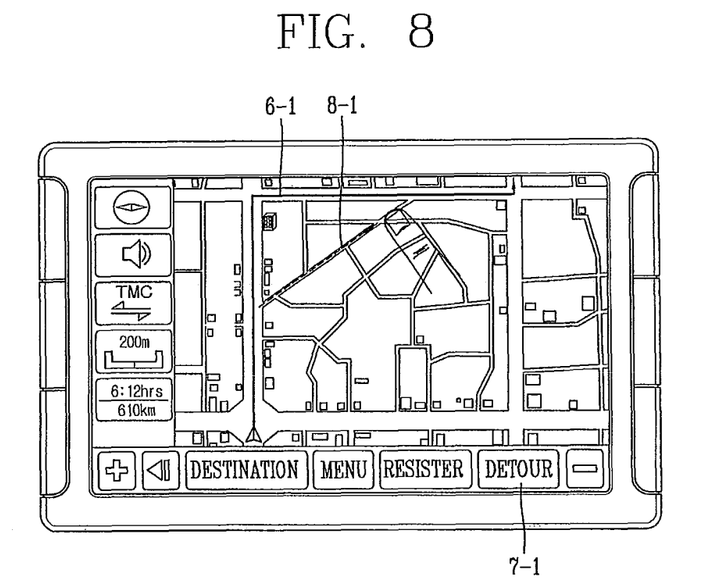
FIG. 8 is an overview of a display screen illustrating a line drawn on a particular road according to the first embodiment of the present invention.

As shown in FIG. 5, the controller 307 then determines whether or not a line has been drawn along a particular road on the road guidance information through the touch screen of the display unit 306 (S14). Further, as discussed above, the user may draw line on the touch screen along the particular road displayed on the road guidance information with a stylus or his or her finger. For example, FIG. 8 is an overview of a display screen illustrating the user drawing a line 8-1 on a particular road using his or her finger. In addition, when the user draws the line 8-1 along a particular road on the road guidance information through (Yes in S14), the controller 307 determines whether or not a road matched to the drawn line 8-1 exists in the map data stored in the storage unit 304. For example, the controller 307 searches the map data for a road matched to the line 8-1 drawn along the particular road by comparing the line 8-1 drawn along the particular road with the map data. When the particular road exists, the controller 307 sets the road matched to the drawn line as the detour (S15).

Figure 9:
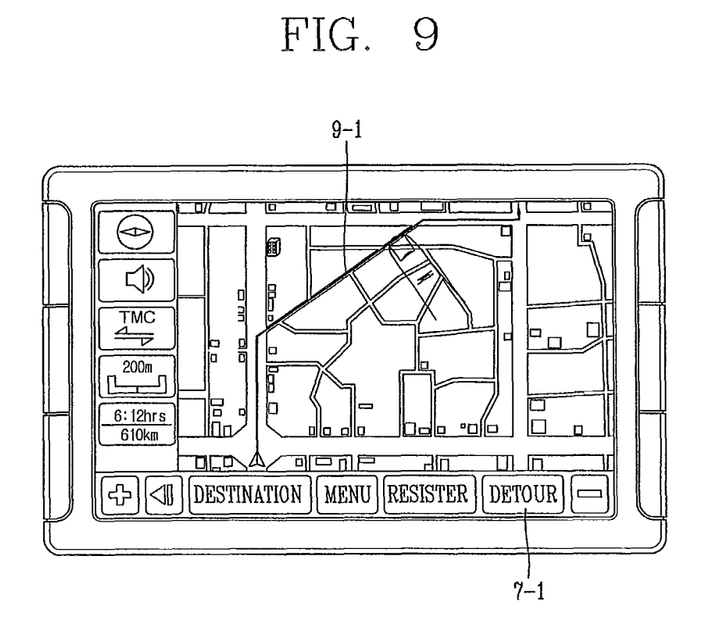
FIG. 9 is an overview of a display screen illustrating a line indicated as a detour according to the first embodiment of the present invention.

For example, FIG. 9 is an overview of a display screen illustrating a drawn line as being a detour 9-1 according to the first embodiment of the present invention. As shown in FIG. 9, the controller 307 automatically sets a road matched to the drawn line as a detour 9-1, and reflects the set detour 9-1 on the road guidance information. Namely, the controller 307 sets the road corresponding to a route between a start point and an end point of the drawn line as the detour 9-1, and provides the road guidance information by way of the set detour 9-1 to the driver (S16).

Figure 10:
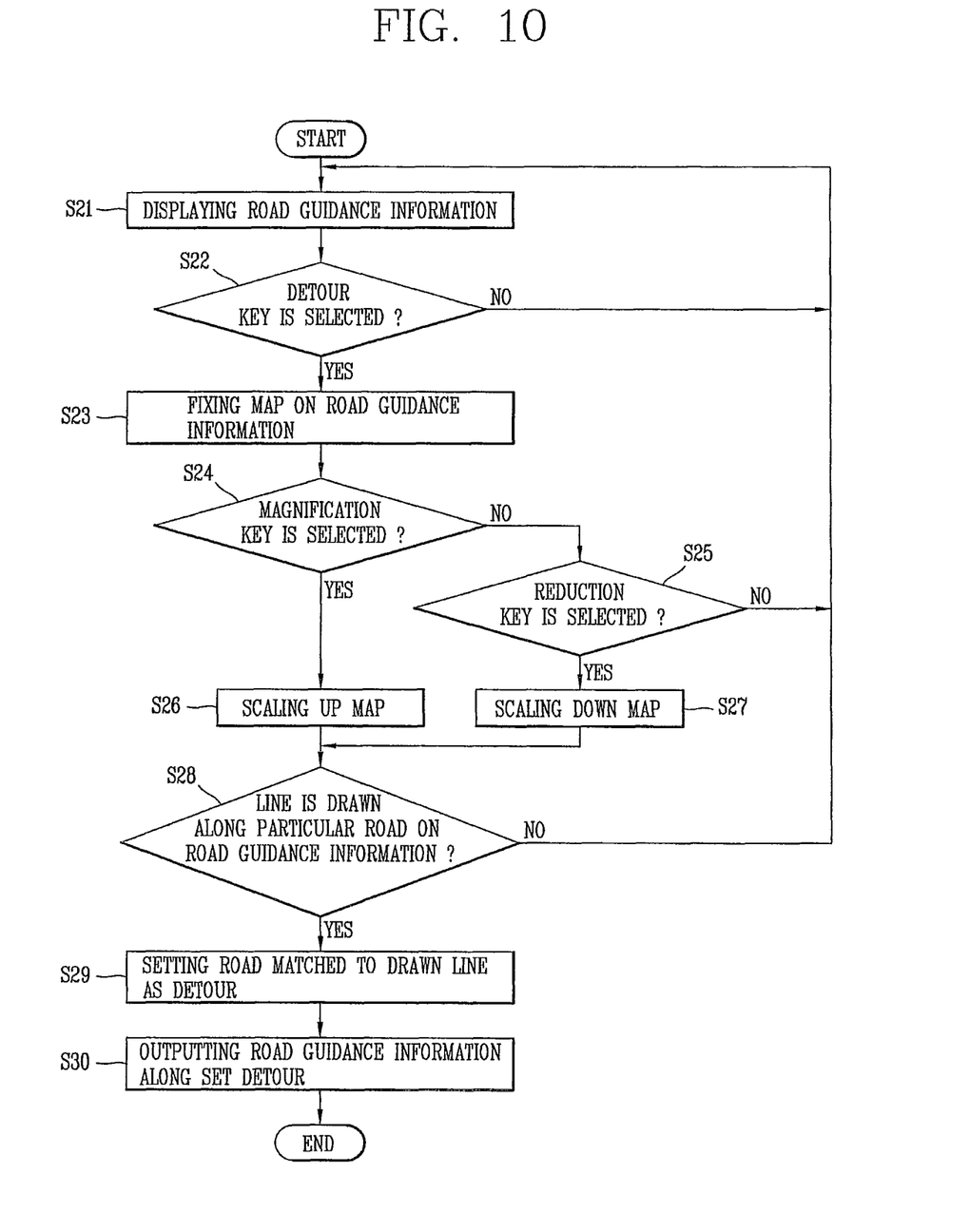
FIG. 10 is a flow chart illustrating a vehicle navigation method according to a second embodiment of the present invention.

Next, FIG. 10 is a flow chart illustrating a vehicle navigation method according to a second embodiment of the present invention. As shown in FIG. 10, the controller 307 generates road guidance information based on matched map information and outputs the generated road guidance information to the display unit 305 and the voice output unit 306. The display unit 305 then displays the road guidance information output from the controller 307 on the screen, and the voice output unit 306 outputs voice information corresponding to the road guidance information (S21).

The controller 307 then determines whether or not the user has selected the detour setting key (button) 7-1 displayed together with the road guidance information (S22). If the detour setting key 7-1 is selected by the user (Yes in S22), the controller 307 fixes the map on the road guidance information (S23). In addition, in this embodiment, when the detour setting key 7-1 is selected by the user, the controller 307 also determines whether or not the user has selected a magnification key 11-1 for magnifying the map on the road guidance information or a reduction key 11-2 for reducing the map on the road guidance information (see also FIG. 11).

Figure 11:
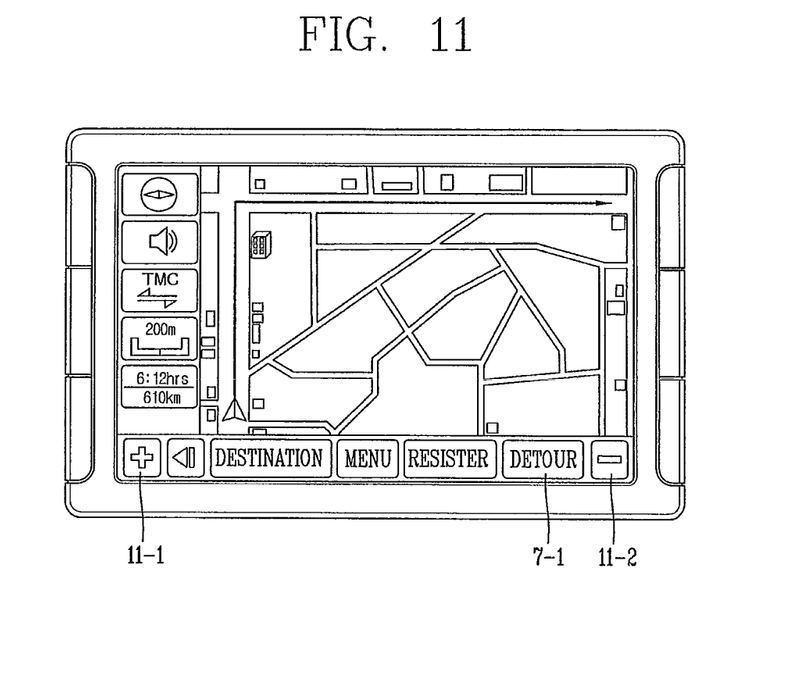
FIG. 11 is an overview of a display screen illustrating a displayed map including road guidance information according to the second embodiment of the present invention.

In more detail, the controller 307 determines whether or not the user has selected the magnification key 11-1 (S24). If the magnification key 11-1 is selected by the user (Yes in S24), the controller 307 magnifies or scales up the map (S26). Further, the controller 307 may gradually scale up the map according to the number of selections of the magnification key 11-1. Also, the user may want to magnify the map to set a short detour in which the currently displayed map is too small in size.

Figure 12:
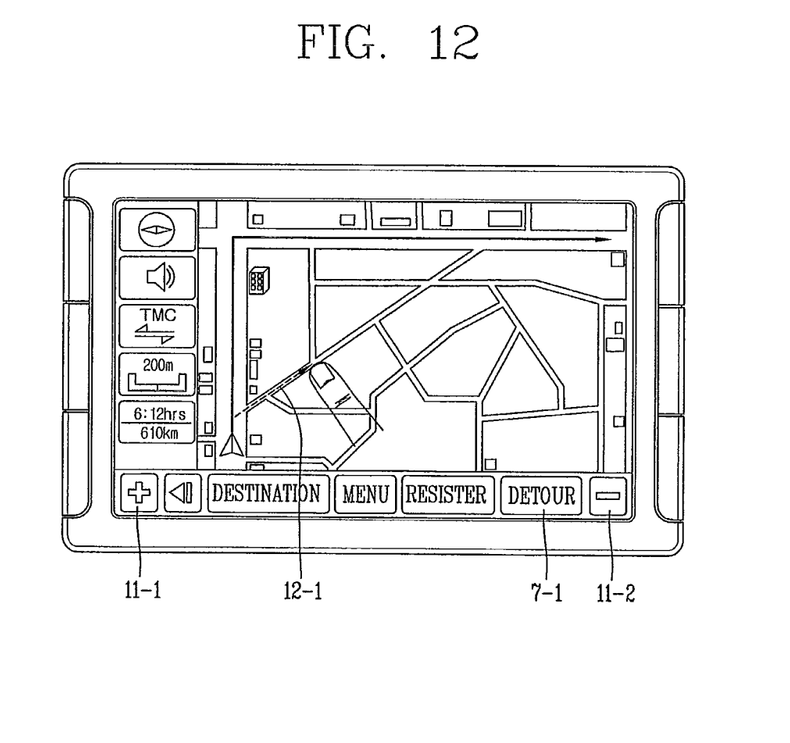
FIG. 12 is an overview of a display screen illustrating a line drawn along a particular road on a magnified map according to the second embodiment of the present invention.

Thereafter, the controller 307 determines whether or not the user has drawn a line along a particular road on the magnified map (S28). Similar to the first embodiment, the user may accurately draw a short line along the particular road displayed on the magnified map with a stylus or his or her finger. For example, FIG. 12 illustrates the user drawing a line 12-1 along a particular road on the magnified map through the touch screen.

The controller 307 then determines whether or not there is a road matched to the drawn line 12-1 in the map data stored in the storage unit 304. For example, the controller 307 searches the map data for a road matched to the line 12-1 drawn along the particular road by comparing the line 12-1 drawn along the particular road with the map data. The controller 307 also automatically sets a road matched to the drawn line 12-1 as a detour, and reflects the set detour on the road guidance information (S29). Namely, the controller 307 sets the road corresponding to a route between a start point and an end point of the drawn line as the detour, and provides the road guidance information by way of the set detour to the driver (S30).

Figure 13:
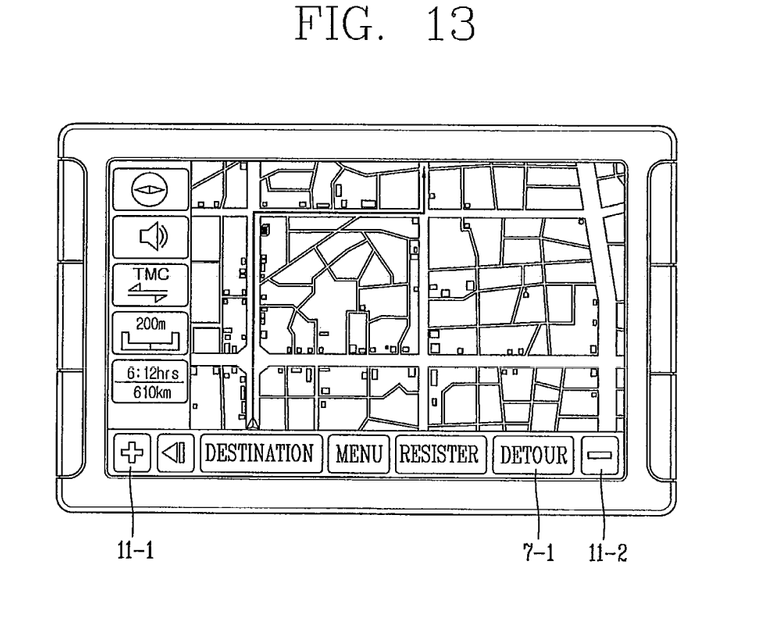
FIG. 13 is an overview of a display screen illustrating a map included with road guidance information being reduced according to the second embodiment of the present invention.

Also, when the detour setting key 7-1 is selected by the user, the controller 307 determines whether or not the user has selected a reduction key 11-2 (see FIGS. 11-15 which illustrate both the magnification key 11-1 and the reduction key 11-2) for reducing the map on the road guidance information (S25). If the user selects the reduction key 11-2 (Yes in S25), the controller 307 reduces the map (S27). For example, FIG. 13 is an overview of a display screen illustrating a reduced map having road guidance information compared to FIG. 12. Further, the controller 307 may gradually scale down the map according to the number of selections of the reduction key 11-2. Also, the user may want to reduce the map to set or designate a long detour when the currently displayed map is too magnified to draw the long line to designate the detour. As discussed above, the user may draw a line long along the particular road displayed on the reduced map with a stylus or his or her finger.

Figure 14:
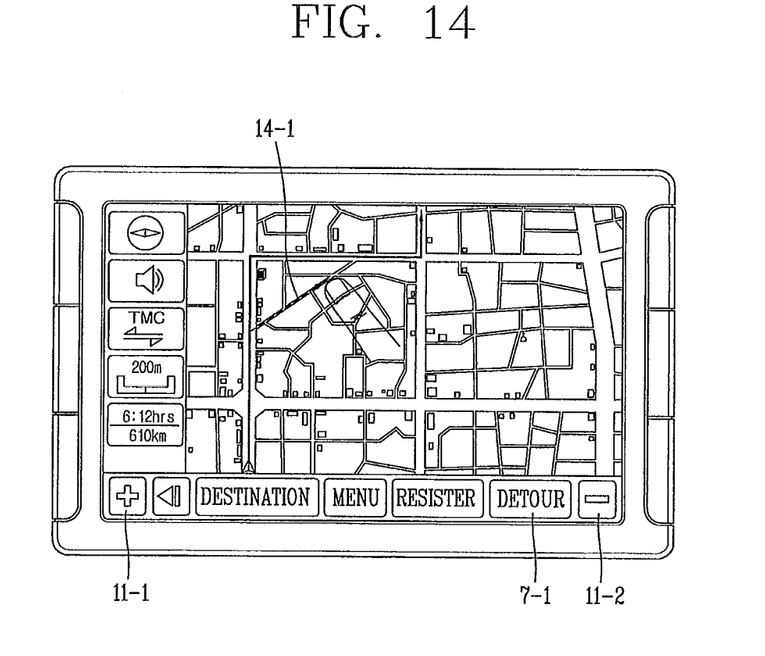
FIG. 14 is an overview of a display screen illustrating a line drawn along a particular road on a reduced map according to the second embodiment of the present invention.

Next, FIG. 14 is an overview of a display screen illustrating the user drawing a line along a particular road on the reduced map according to the second embodiment of the present invention. As shown in FIG. 14, when the user draws a line 14-1 on the touch screen along a particular road on the reduced map, the controller 307 determines whether or not there is a road matching the drawn line 14-1 in the map data stored in the storage unit 304. For example, the controller 307 searches the map data for a road matched to the line 14-1 drawn along the particular road by comparing the line 14-1 drawn along the particular road with the map data.

The controller 307 also automatically sets a road matched to the drawn line 14-1 as a detour, and reflects the set detour on the road guidance information. That is, the controller 307 sets the road corresponding to a route between a start point and an end point of the drawn line as the detour, and provides the road guidance information by way of the set detour to the driver. In addition, the user may draw the line along the particular road, or may draw a curve, ellipse or circle along a particular road.

Figure 15:
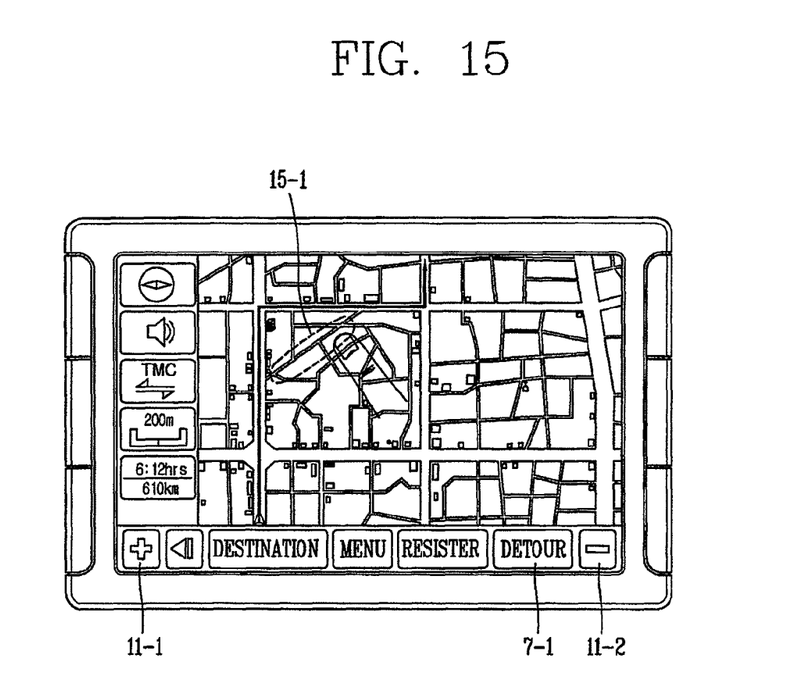
FIG. 15 is an overview of a display screen illustrating a curved line drawn along a particular road on a map according to a third embodiment of the present invention.

For example, FIG. 15 is an overview of a display screen illustrating a looped curve drawn along a particular road on a map according to a third embodiment of the present invention. As shown in FIG. 15, when the user draws a looped curve 15-1 on the touch screen along a particular road on the map, the controller 307 determines whether or not there is a road matched to the drawn looped curve 15-1 in the map data stored in the storage unit 304. For example, the controller 307 searches the map data for a road matching the looped curve 15-1 drawn along the particular road by comparing the looped curve 15-1 drawn along the particular road with the map data. Also, if a plurality of roads is matched to the looped curve 15-1 drawn along the particular road, the controller 307 may set a road adjacent to or that is closest to a pre-set travel road as a detour. The controller 307 can also display the plurality of roads and let the user choose one of the roads.

The user can thus draw a line on the particular road, and draw a loop around the particular road, etc. to designate the particular road as a detour. The user could also double touch the particular road, touch beginning and ending portions (or other portions) of the particular road, simultaneously or in a successive manner to designate the particular road as the detour.

Also, in an alternative embodiment, the setting and displaying of the detour route can only be performed when the speed is below a particular speed limit. In more detail, some states restrict the use of devices that require the hand operation by the driver (e.g., cell phones, navigation devices, etc.). Thus, in one embodiment, the controller restricts the setting of the detour line to a particular speed limit (e.g., below 30 mph). If the user is driving faster than the set speed limit, the detour operation will not be executed when the user draws on the map or selects the detour key. The predetermined speed limit can be set by the manufacturer of the terminal (e.g., based on a condition set by the local state government) or can be downloaded to the apparatus as the user is driving from town to town or from state to state (each state may have different laws and speed limits concerning the use of the navigation device). Thus, the driver can operate the navigation apparatus in a safer manner.

Figure 16:
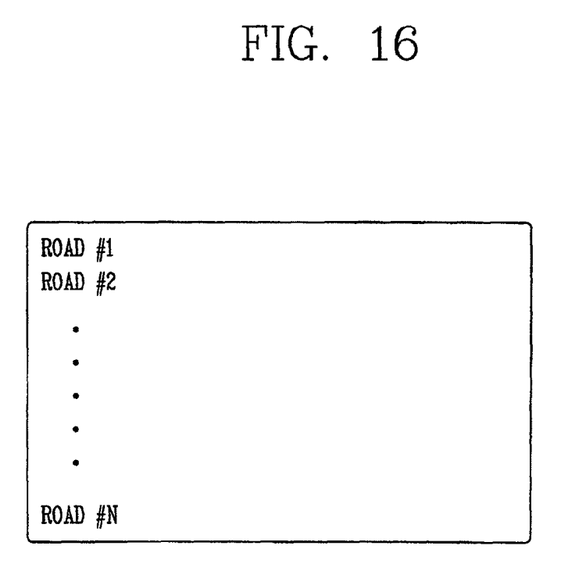
FIG. 16 is an overview of a display screen illustrating a plurality of roads that match or correspond with a particular road that has been drawn on according to an embodiment of the present invention.

In addition, FIG. 16 illustrates the searching step finding a plurality of roads that match or correspond with the particular road that has been drawn on; displaying the found plurality of roads that match or correspond with the particular road that has been drawn on; receiving a selection signal corresponding to a selection of one of the displayed plurality of found roads; and setting the selected one of the plurality of found roads as the detour.

Thus, the embodiments of the present invention have several advantages. For example, the user can easily designate a detour road while road guidance information is being provided. The user is also able to freely determine and designate an "on-the-fly" a detour route as they are traveling along an original route. This can save the user an enormous of time, because he or she can avoid accidents, congestion, etc.

The mobile terminals including the navigation features of the present invention include, for example, personal digital assistants (PDAs), portable multimedia players (PMPs), navigation terminals, or the like, as well as to the telematics terminal or the mobile terminal. In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. The mobile terminal 100 may be implemented in various forms.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a vehicle navigation apparatus included in a vehicle, the method comprising:
    displaying, via a controller, a map on a touch screen display of the vehicle navigation apparatus;
    displaying, via the controller, road guidance information on the map and including a set travel route from a current position of a vehicle to a destination;
    receiving, via the controller, a user input corresponding to a request for magnifying or reducing the map for setting a detour road;
    magnifying or reducing, via the controller, the map based on the user input;
    receiving, via the controller, an input corresponding to a request for beginning a detour operation;
    fixing, via the controller, the magnified or reduced map displayed on the touch screen display upon receiving the input corresponding to the received request for beginning the detour operation;
    determining via the controller, whether a line has been drawn on the fixed map, said line being different than a road included in the set travel route from the current position of the vehicle to the destination;
    determining, via the controller, a current speed of the vehicle;
    finding, via the controller, a plurality of roads that match the drawn line;
    automatically setting, via the controller, a road closest to a pre-set travel road as the detour road among the plurality of found roads;
    determining, via the controller, a vehicle speed limit for setting the detour road;
    comparing, via the controller, the vehicle speed limit with the determined current speed of the vehicle; and
    distinctively displaying, via the controller, the set road as the detour road only when the comparing step determines the current speed of the vehicle is less than the vehicle speed limit.

2. The method of claim 1, wherein the setting the road as the detour further comprises:
    searching a memory including the displayed road guidance information for the plurality of roads that match with the drawn line.

3. The method of claim 2, wherein the searching step further comprises:
    displaying the found plurality of roads that match the drawn line;
    receiving a selection signal corresponding to a selection of one of the displayed plurality of found roads; and
    setting the selected one of the plurality of found roads as the detour.

4. The method of claim 1, wherein the distinctively displaying step distinctively displays the set road with at least one of a predetermined color, a solid line, a dotted line and a blinking or flashing line.

5. The method of claim 1, wherein the determining step determines a particular road has been drawn on when the line is drawn along the particular road, a loop or partial loop is drawn around at least a portion of the particular road, the particular road is touched twice in a double touch manner, or a beginning and ending portion of the particular road is touched simultaneously or in a successive manner.

6. The method of claim 1, wherein the input corresponding to the request for beginning the detour operation comprises one of a selection of a soft touch key displayed with the road guidance information, a selection of a physical key, a voice command and a proximity touching operation.

7. The method of claim 1, further comprising:
    receiving a GPS (Global Positioning System) signal, and generating first location data of the vehicle based on the received GPS signal;
    generating second location data based on a travel direction and speed of the vehicle;
    generating a vehicle estimated location based on the first and second location data;
    matching the vehicle estimated location with a map matching link;
    generating the road guidance information based on results of the matching step;
    displaying the road guidance information.

8. A vehicle navigation apparatus, comprising:
a touch screen display unit configured to display a map and road guidance information including a set travel route from a current position of a vehicle to a destination; and
a controller configured to:
receive a user input corresponding to a request for magnifying or reducing the map for setting a detour road;
magnify or reduce the map based on the user input;
receive an input corresponding to a request for beginning a detour operation;
fix the magnified or reduced map displayed on the touch screen display upon receiving the input corresponding to the received request for beginning the detour operation;
determine whether a line has been drawn on the fixed map, said line being different than a road included in the set travel route from the current position of the vehicle to the destination;
determine a current speed of the vehicle;
find a plurality of roads that match the drawn line;
automatically set a road closest to a pre-set travel road as the detour road among the plurality of found roads;
determine a vehicle speed limit for setting the detour road;
compare the vehicle speed limit with the determined current speed of the vehicle; and
control the display unit to distinctively display the set road as the detour road only when the determined current speed of the vehicle is less than the vehicle speed limit.

9. The apparatus of claim 8, wherein the controller is further configured to search a memory including the displayed road guidance information for the plurality of roads that match the drawn line.

10. The apparatus of claim 9, wherein the controller is further configured to control the display unit to display the found plurality of roads that match the drawn line, to receiving a selection signal corresponding to a selection of one of the displayed plurality of found roads, and to set the selected one of the plurality of found roads as the detour.

11. The apparatus of claim 8, wherein the controller is further configured to control the display unit to distinctively display the set road with at least one of a predetermined color, a solid line, a dotted line and a blinking or flashing line.

12. The apparatus of claim 8, wherein the controller is further configured to determine a particular road has been drawn on when the line is drawn along the particular road, a loop or partial loop is drawn around at least a portion of the particular road, the particular road is touched twice in a double touch manner, or a beginning and ending portion of the particular road is touched simultaneously or in a successive manner.

13. The apparatus of claim 8, wherein the input corresponding to the request for beginning the detour operation comprises one of a selection of a soft touch key displayed with the road guidance information, a selection of a physical key, a voice command or a proximity touch.

14. The apparatus of claim 8, further comprising:
a Global Position System (GPS) module configured to receive a GPS signal, and to generate first location data of the vehicle based on the received GPS signal,
wherein the controller is further configured to generate second location data based on a travel direction and speed of the vehicle, to generate a vehicle estimated location based on the first and second location data, to match the vehicle estimated location with a map matching link, to generate the road guidance information based on results of the matching step, and to control the display unit to display the road guidance information.

\* \* \* \* \*